(No Model.) 2 Sheets—Sheet 1.

A. NEUVILLE & A. BACK.
RACK FOR EXHIBITING GOODS.

No. 383,975. Patented June 5, 1888.

WITNESSES:
John W. Deemer
C. Sedgwick

INVENTOR:
A. Neuville
BY A. Back
Munn & Co.
ATTORNEYS.

(No Model.) 2 Sheets—Sheet 2.

A. NEUVILLE & A. BACK.
RACK FOR EXHIBITING GOODS.

No. 383,975. Patented June 5, 1888.

WITNESSES:
John H. P. Deemer
C. Sedgwick.

INVENTOR:
A. Neuville
BY A. Back
Munn & Co.
ATTORNEYS.

UNITED STATES PATENT OFFICE.

ADOLPH NEUVILLE, OF ST. LOUIS, MISSOURI, AND ALBERT BACK, OF NEW YORK, N. Y.; SAID BACK ASSIGNOR TO TILLIE BACK, OF NEW YORK, N. Y.

RACK FOR EXHIBITING GOODS.

SPECIFICATION forming part of Letters Patent No. 383,975, dated June 5, 1888.

Application filed January 10, 1888. Serial No. 260,303. (No model.)

*To all whom it may concern:*

Be it known that we, ADOLPH NEUVILLE, of St. Louis, in the State of Missouri, and ALBERT BACK, of the city, county, and State of New York, have invented a new and Improved Rack for Exhibiting Goods, of which the following is a full, clear, and exact description.

The object of our invention is to provide a practical device to be used in dry-goods stores, whereby lace curtains and other goods may be exhibited to customers to advantage; and to this end our invention consists of the construction, arrangement, and combination of parts, all as hereinafter described and claimed.

Reference is to be had to the accompanying drawings, forming a part of this specification, in which similar letters of reference indicate corresponding parts in all the figures.

Figure 1:
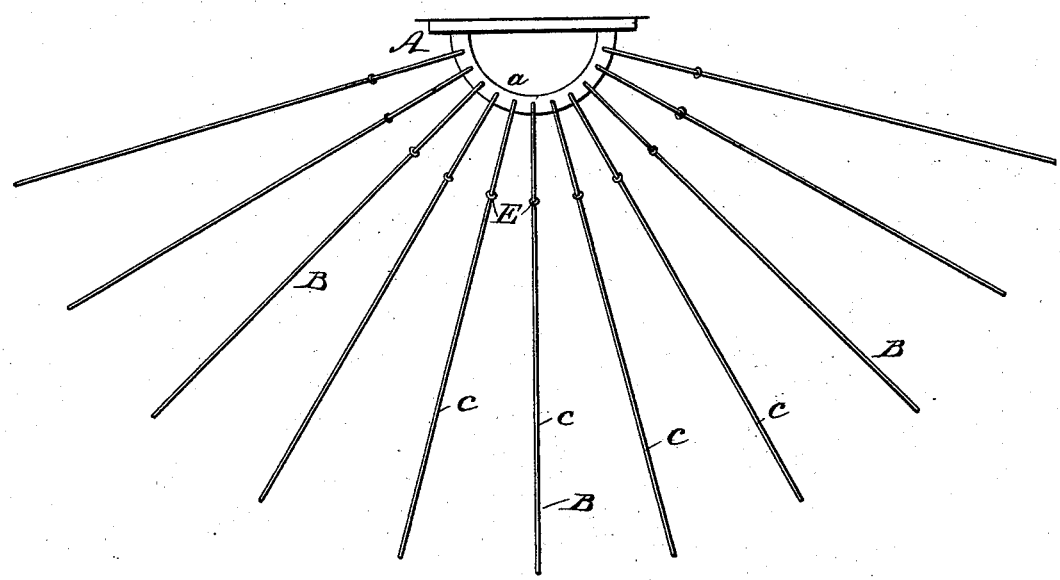
Figure 2:
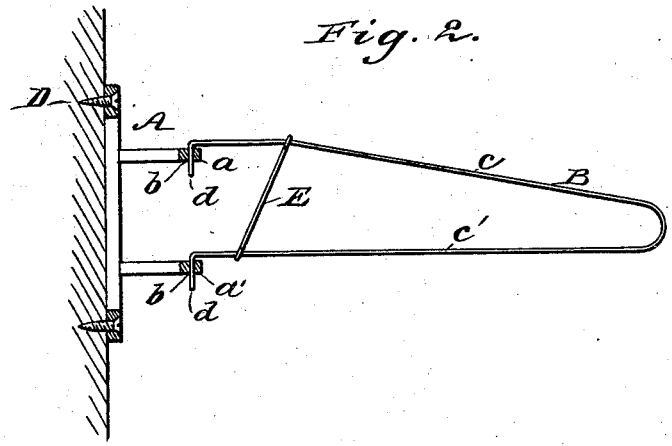
Figure 3:
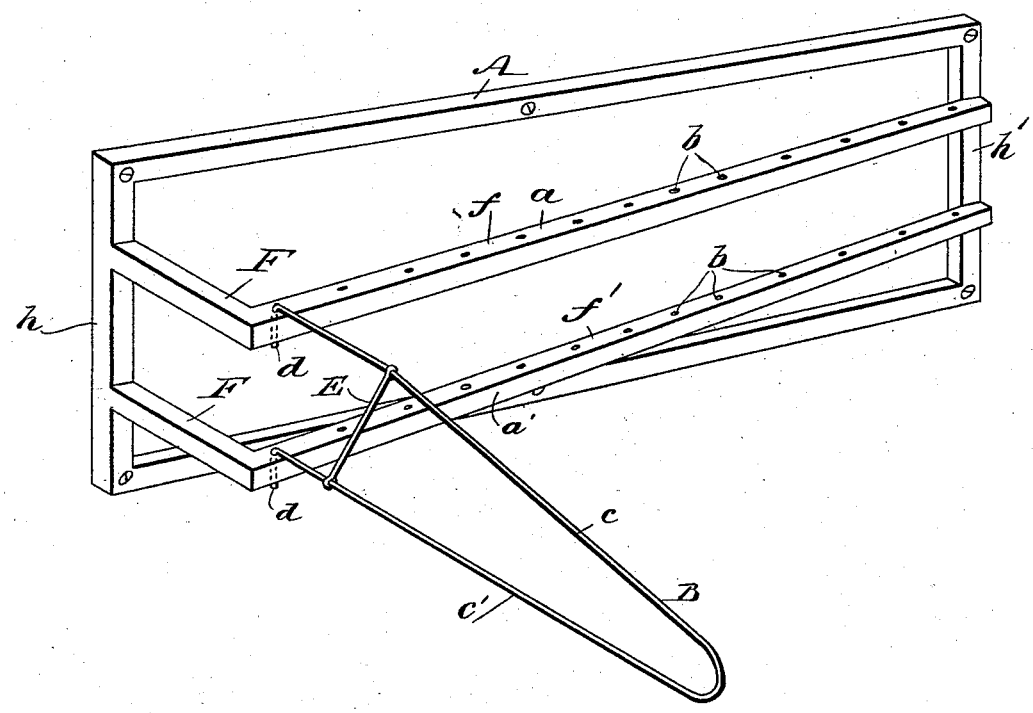

Figure 1 is a plan view of the rack. Fig. 2 is a sectional elevation of the same, showing the rack attached to a wall, pillar, or other support; and Fig. 3 is a perspective view showing a modification.

A represents the main body of the rack formed with supports $a\ a'$ for the arms B B. In Figs. 1 and 2 the supports $a\ a'$ are curved or semicircular in form, and are pierced with corresponding series of holes, $b$, for holding the said arms B. The frame A is made flat and adapted to be secured to a flat surface, as a wall or other flat upright support, D, for holding the arms B in horizontal position. The arms B are made of wire folded in the center to form the upper and lower members, $c\ c'$, the ends of the wire being bent downward to form hooks $d$ to enter the holes $b\ b$ in the bows $a\ a'$, as shown clearly in Fig. 2. The lower members, $c'$, of the arms D are practically horizontal, and it is over these that the fabric to be exhibited is to be placed. The upper members, $c$, are inclined, as shown in Figs. 2 and 3, and act as braces to the lower members, $c'$, and on each arm is placed an additional brace-rod, E, which serves to prevent the arms from sagging. The arms B turn freely in the supports $a\ a'$, the hooks $d$ serving as hinges, so that a piece of fabric may be placed upon each arm and the whole swung to one side, and then swung out again singly to exhibit the goods. In the form of rack shown in Figs. 1 and 2 one-half of the arms B must be swung one way, while the other half must be swung in the opposite direction. To adapt the rack to permit the arms to be swung in one direction, which is necessary in some situations, we make the frame A rectangular in form, as shown in Fig. 3, and form one upright end bar, $h$, with the horizontal arms F F. To the outer ends of these are connected the bars $f f'$, which reach diagonally to the opposite end bar, $h'$, so that the bars $f f'$ are diagonal to the main frame A and to the wall against which it may be attached or held. The bars $f f'$ are correspondingly pierced with small holes $b$ to receive the hooks $d$ of the arms B. By this form and arrangement of the supports for the arms the whole series of arms may be folded to one side and occupy small space.

Having thus described our invention, what we claim as new, and desire to secure by Letters Patent, is—

The vertical frame A, having horizontal arms F F at right angles to the said frame, and the pierced horizontal diagonal supports or bars $f f'$, in combination with the arms B B, bent to form the members $c\ c'$ and hooks $d$, substantially as described.

ADOLPH NEUVILLE.
ALBERT BACK.

Witnesses:
E. M. CLARK,
C. SEDGWICK.